United States Patent
Kawamura et al.

(10) Patent No.: US 6,851,864 B2
(45) Date of Patent: Feb. 8, 2005

(54) ROLLING BEARING

(75) Inventors: Hisashi Kawamura, Kanagawa (JP); Yukio Ooura, Kanagawa (JP); Mineo Kameko, Kanagawa (JP)

(73) Assignee: NSK Ltd., Tokyo (JP)

( * ) Notice: Subject to any disclaimer, the term of this patent is extended or adjusted under 35 U.S.C. 154(b) by 64 days.

(21) Appl. No.: 10/374,058

(22) Filed: Feb. 27, 2003

(65) Prior Publication Data

US 2003/0219182 A1 Nov. 27, 2003

(30) Foreign Application Priority Data

Feb. 27, 2002 (JP) ..................................... P2002-052046

(51) Int. Cl.$^7$ ............................................... F16C 33/32
(52) U.S. Cl. ..................................... 384/492; 384/913
(58) Field of Search ............................. 384/492, 569, 384/913

(56) References Cited

U.S. PATENT DOCUMENTS

2002/0023695 A1    2/2002    Kinno et al.

FOREIGN PATENT DOCUMENTS

GB    2 227 031 A    7/1990
JP    9-133130    5/1997

OTHER PUBLICATIONS

B.A. Tassone; "Roller Bearing Slip and Skidding Damage"; Journal of Aircraft, vol. 12, No. 4, Apr. 1975.
Frederick D. Slaney; Hybrid Ceramic Bearing Development For Gas Turbine Engines The American Society of Mechanical Engineers, No. 94–GT–112.

Primary Examiner—Thomas R. Hannon
(74) Attorney, Agent, or Firm—Sughrue Mion, PLLC

(57) ABSTRACT

A bearing with a ball contact with a raceway groove of one of an outer ring and an inner ring at one point and the other at two points. The surface of the ball and the surface of the race of the outer ring and the race of the inner ring were provided with a phosphorus-based modified layer. The ball bearing is at a rotary speed as high as not lower than 70 m/s as calculated in terms of V and a load as small as not greater than 0.05 as calculated in terms of Pr/Cr supposing that the dynamic equivalent radial load is Pr, the basic dynamic rated load is Cr, one of the inner ring and the outer ring is a driving ring and the slip rate of the ball to the one of the inner ring and the outer ring as a driving ring is V.

1 Claim, 5 Drawing Sheets

MOTHER LINE PROFILE OF INNER RING

TEST BEARING HAVING PHOSPHOUS-BASED MODIFILD LAYER FORMED THEREON

SKIDDING DAMAGE AREA

MOTHER LINE PROFILE OF INNER RING

TEST BEARING FREE OF PHOSPHOUS-BASED MODIFILD LAYER FORMED THEREON

ROLLING BEARING

BACKGROUND OF THE INVENTION

1. Field of the Invention

The present invention relates to a rolling bearing which is subject to frequent occurrence of skidding due to operation at a high rotary speed and a low load, and more relates to a rolling bearing suitable for use as main shaft bearing for jet engine or gas turbine engine, bearing for external gear box and internal gear box of these engines or high-speed pinion bearing for them.

2. Description of the Related Art

In general, a rolling bearing comprising an outer ring, an inner ring and rolling elements. The rolling bearing is used in sites where some load is acted on.

However, when the rolling bearing is operated at a very small load (low load), a contact force of the rolling elements with respect to the raceway surface of the inner ring and the outer ring runs short, whereby skidding occurs therebetween.

When the rolling bearing is operated at a high rotary speed, the skidding occurs remarkably, causing abrasion called "skidding damage" on the slipping area between the rolling elements and the rolling surface of the inner ring and the outer ring. Accordingly, a life of the rolling bearing is drastically reduced.

In particular, a three point contact ball bearing comprises balls. The balls are kept in contact with one of the raceway surface of the outer ring and the inner ring at one point, and the other at two points. When the three point contact ball bearing is operated at a high rotary speed and a low load, skidding immediately occurs because the balls come in contact with the raceway surfaces at a relatively low constant pressure. Accordingly, this causes skidding damage that rapidly reduces the life of the bearing.

It is known that all the parts (outer ring, inner ring, rolling element) of a rolling bearing, which is operated at a high rotary speed and a low load, are made of heat-resistant bearing steel having a higher skidding abrasion resistance than ordinary bearing steel such as M50 (AMS6491: Aerospace Material Specification.

However, the rolling bearing cannot be certainly protected against skidding damage upon frequent occurrence of slipping because the bearing steel is not sufficiently resistant to abrasion.

In order to solve these problems, some approaches have been proposed. For example, the rolling elements of the aforementioned rolling bearing are made of ceramics. Alternatively, for bearings having rollers as rolling elements, the raceway surface of the outer ring is shaped ellipsoidal or triangular so that a pre-load is imposed on the rollers in order to certainly prevent the rolling bearing from slipping.

However, all these approaches are disadvantageous in that they cause a rise of production cost or complication of production process.

SUUMARY OF THE INVENTION

It is an object of the present invention to provide a rolling bearing which can be certainly prevented against skidding damage even upon frequent occurrence of skidding due to operation at a high rotary speed and a low load and can reduce the production cost and simplify the production process.

In first aspect of the present invention, a rolling bearing comprising: an outer ring formed by bearing steel; an inner ring formed by bearing steel; and a rolling element formed by bearing steel, wherein a phosphorus-based modified layer is formed on at least one of raceway surfaces among said rolling element, said outer ring, and said inner ring.

The term "phosphorus-based modified layer" is defined as a layer includes an oxygen compound layer formed on the surface of the bearing material (outer ring, inner ring and rolling element) and a phosphorus compound layer formed by the pyrolysis of a phosphorus compound on the oxygen compound layer. The oxygen compound layer is a seizure-resistant reactive layer including metal elements as bearing materials (e.g., iron) and oxygen. The phosphorus compound layer is a layer mainly including metal elements as bearing materials (e.g., iron), oxygen and phosphorus.

The second aspect of the invention lies in the rolling bearing of the first aspect which is a ball bearing wherein the rolling element is a ball and the ball is supported at one point on one of the race of the outer ring and the inner ring and at two points on the other.

The third aspect of the invention lies in the rolling bearing of the first or second aspect which is operated at a load as small as not greater than 0.05 as calculated in terms of Pr/Cr supposing that the dynamic equivalent radial load is Pr and the basic dynamic rated load is Cr.

The fourth aspect of the invention lies in the rolling bearing of the first or second aspect which is operated at a rotary speed as high as not lower than 70 m/s as calculated in terms of V supposing that one of the inner ring and the outer ring is a driving ring and the slip rate of the rolling element relative to the driving ring is V.

Further, the fifth aspect of the invention lies in the rolling bearing of the first or second aspect which is operated at a rotary speed as high as not lower than 70 m/s as calculated in terms of V and a load as small as not greater than 0.05 as calculated in terms of Pr/Cr supposing that the dynamic equivalent radial load is Pr, the basic dynamic rated load is Cr, one of the inner ring and the outer ring is a driving ring and the slip rate of the rolling element relative to the driving ring is V.

DESCRIPTION OF THE PREFFERRED EMBODIMENTS

Embodiments of the rolling ball bearing of the invention will be described in connection with the attached drawings.

Figure 1:
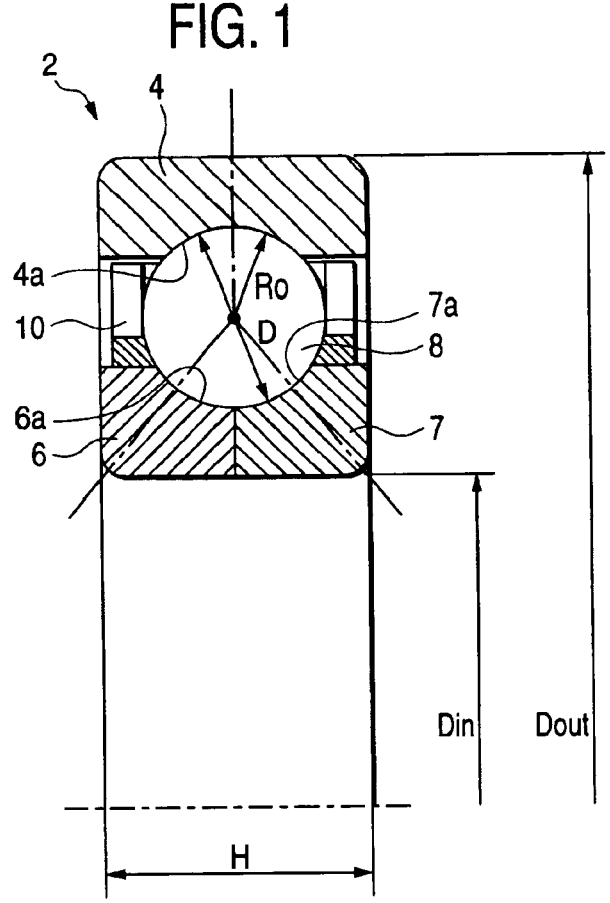
FIG. 1 is a diagram illustrating a main part of a three point contact ball bearing, which is a first embodiment of implementation of the invention.

FIG. 1 illustrates a main part of a three point contact ball bearing 2, which is a first embodiment of implementation of the invention.

The three point contact ball bearing 2 of the present embodiment comprises an outer ring 4, inner rings 6 and 7 formed by bearing steel, a number of balls 8 formed by bearing steel retained interposed between the outer ring 4 and the inner ring 6, and a retainer 10 formed by bearing steel which retains the balls 8 at a predetermined interval.

The outer ring 4 has a raceway groove 4a having an arc section with a radius R0 formed therein. The inner ring 6 has a raceway groove 6a having a gothic arc section formed therein. The ball 8 is a sphere having a diameter D. The ball 8 is retained interposed between the outer ring 4 and the inner ring 6 while coming in contact with the raceway groove 4a of the outer ring 4 at one point and the raceway grooves 6a and 7a of the inner rings 6 and 7 at two points.

The outer ring 4, the inner rings 6 and 7 and the ball 8 of the three point contact ball bearing 2 have a phosphorus-based modified layer formed on the surface thereof.

Figure 2:
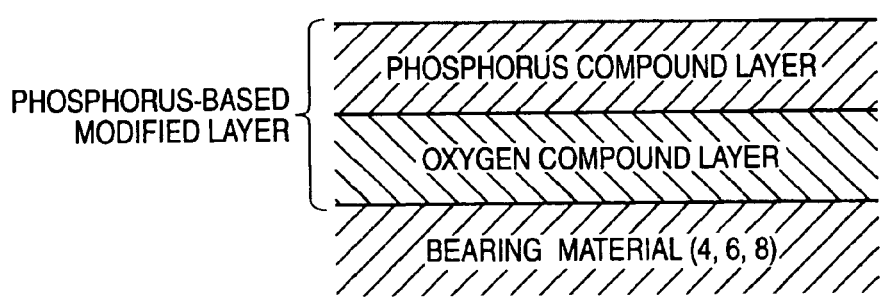
FIG. 2 is a schematic diagram typically illustrating a phosphorus-based modified layer according to the invention.

As shown in FIG. 2, the phosphorus-based modified layer includes an oxygen compound layer formed on the surface of the bearing material (outer ring 4, inner rings 6 and 7 and ball 8) and a phosphorus compound layer formed by the pyrolysis of a phosphorus compound on an oxygen compound layer. The aforementioned oxygen compound layer is a seizure-resistant reactive layer mainly including metal elements as bearing materials (e.g., iron) and oxygen. The aforementioned phosphorus compound layer is a layer mainly including metal elements as bearing materials (e.g., iron), oxygen and phosphorus.

The oxygen compound layer formed on the surface of the bearing material (outer ring 4, inner rings 6 and 7, and ball 8) has such functions that the oxygen compound layer prevents an deterioration of the surface roughness of the bearing material by the reaction of the phosphorus compound layer formed on the oxygen compound layer with the surface of the bearing material upon pyrolysis and that enhancing the adhesivity of the phosphorus compound layer thus formed with the surface of the bearing material.

Accordingly, the provision of the phosphorus-based modified layer on the surface of the outer ring 4, the inner rings 6 and 7 and the ball 8 makes it possible to enhance the bonding of the surface of the ball 8, the raceway groove 4a of the outer ring 4 and the raceway grooves 6a and 7a of the inner rings 6 and 7 to the phosphorus compound layer formed via the oxygen compound layer without aggravating the roughness thereof and hence obtain a surface suitable for low frictional properties.

Figure 3:
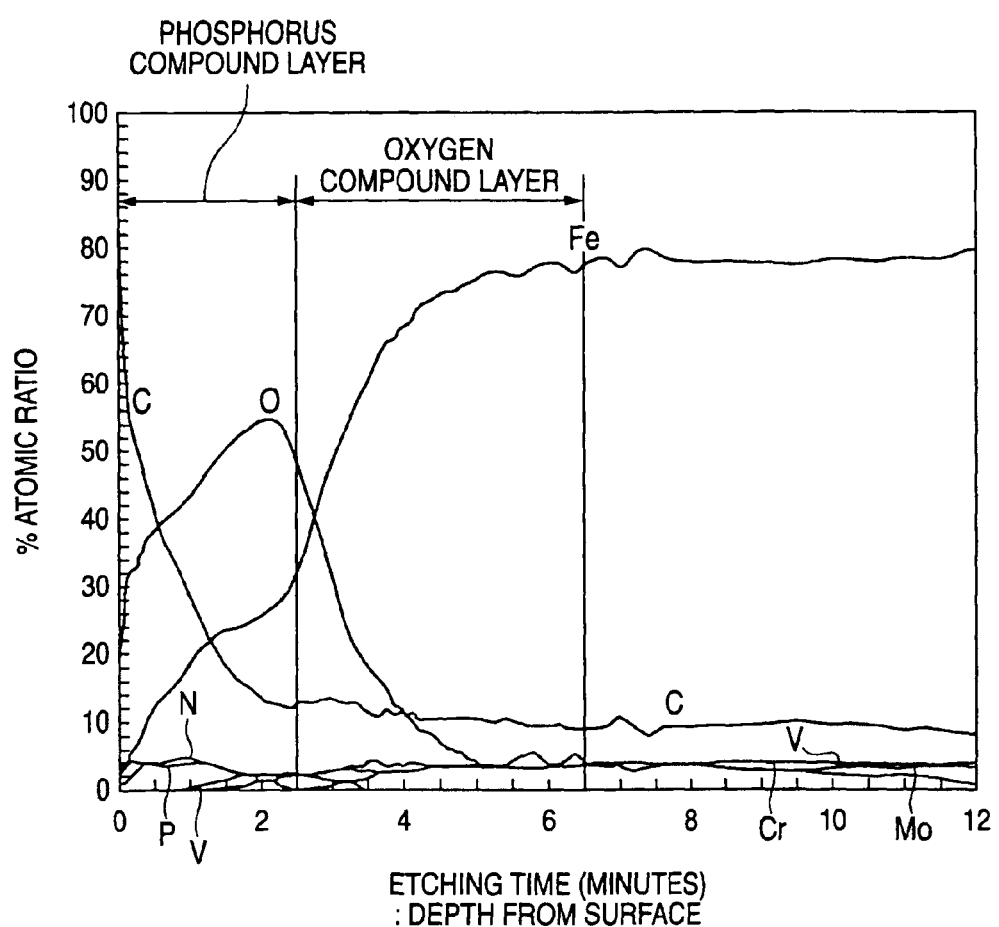
FIG. 3 is a diagram illustrating the depth profile of composition ratio of a phosphorus-based modified layer formed on a rolling bearing of the invention measured using an Auger electron spectroscopic analyzer.

FIG. 3 illustrates an example of measurements of thickness of phosphorus compound layer formed in the bearing material with tricresyl phosphite as a phosphorus compound and oxygen compound layer.

Using AES (Auger electron spectroscopic analyzer), a depth profile of sample is taken. The thickness of the phosphorus compound layer and the oxygen compound layer are determined by the etching time, which is taken by sputtering on an $SiO_2$ substrate. Accordingly, the thickness of these layers are determined from the sputtering time, which is taken shortly before the termination of photo electron intensity of phosphorus (P) and oxygen (O) in the compound layers, and known sputtering rate.

The three point contact ball bearing 2 according to the first embodiment shown in FIGS. 1 to 3 was subjected to skidding test.

As test bearings there were used two kinds of bearing having an inner diameter Din of 60 mm, an outer diameter Dout of 110 mm and a width H of 25 mm. The inner rings 6 and 7, the outer ring 4 and the ball 8 of these test bearings were all made of M50 material.

Subsequently, one of the two test bearings was immersed and ultrasonically cleaned in a petroleum benzidine, and then the test bearing were dried at ordinary temperature in such a manner that no oil content was left. The test bearing was then heated in the atmosphere to form an oxygen compound layer on the surface thereof. Thereafter, the test bearing was immersed in a treatment solution, which is obtained by incorporating 4% by weight of PAN (phenyl-α-naphthylamine) as an oxidation inhibitor in a synthetic hydrocarbon oil (poly-α-olefin) having 3% by weight of trioctyl phosphate incorporated therein, so that a phosphorus compound layer on the oxygen compound layer as a phosphorus-based modified layer is formed.

The other test bearing was free of phosphorus-based modified layer.

As to the two test bearings, i.e., test bearing having a phosphorus-based modified layer formed thereon and test bearing free of phosphorus-based modified layer, skidding test for 200 hours is taken under conditions that the inner rings 6 and 7 rotate as a driving ring at a high rotary speed (40,000 rpm) and the axial load of the ball 8 is predetermined to be a very small value such that the slip ratio is highest.

Figure 4:
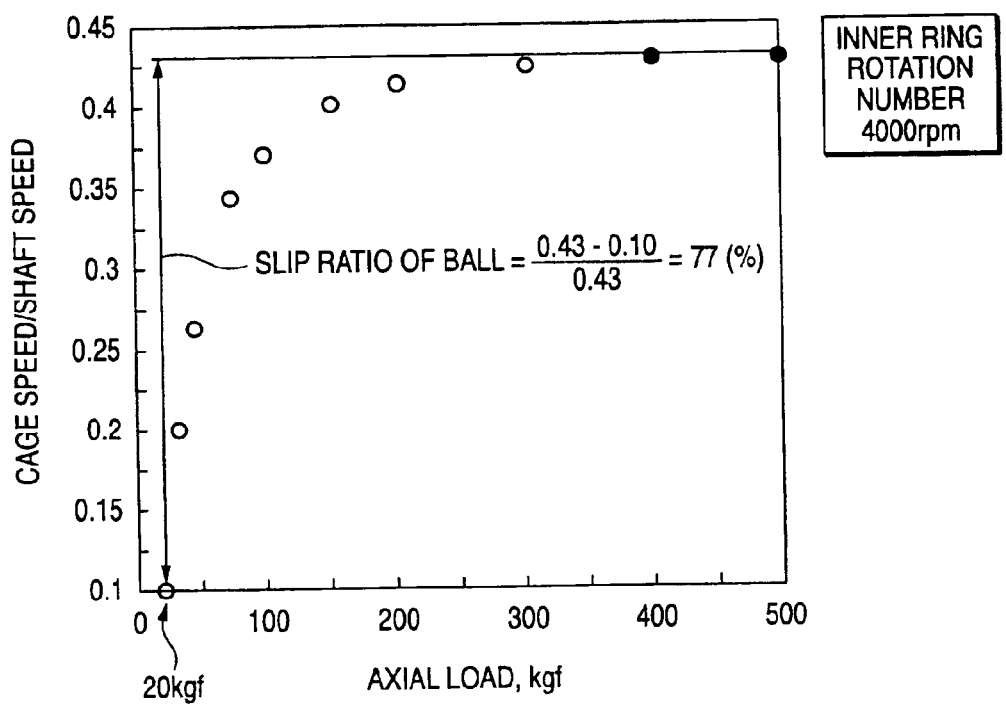
FIG. 4 is a graph illustrating the characteristics of revolving slip of rolling bearing of the first embodiment of the invention with respect to the change of axial load upon the rotation of the inner ring at a high rotary speed.

FIG. 4 is a graph illustrating the characteristics of revolving slip of ball 8 with respect to the change of axial load upon the rotation of the inner rings 6 and 7 at a speed as high as 40,000 rpm.

When the axial load is not smaller than 300 kgf, the revolving slip of the ball 8 decreases. When the axial load falls below 200 kgf, the revolving slip of the ball 8 gradually increases. When the axial load is 20 kgf, the revolving slip rate of the ball 8 gradually reaches highest (77%).

Supposing that the dynamic equivalent radial load of the test bearing is Pr, the radial load coefficient of the test bearing is X, the axial load coefficient of the test bearing is Y, the radial load of the test bearing is Fr and the axial load of the test bearing is Fa, the following relationship can be established:

$$Pr = X \cdot Fr + Y \cdot Fa \qquad (1)$$

When the axial load Fa of the test bearing is 20 kgf, the degree of load on the test bearing is as small as 0.003 as calculated in terms of Pr/Cr wherein Pr is the dynamic equivalent radial load and Cr is the basic dynamic rated load of the test bearing:

$$Pr/Cr = 0.003 \qquad (2)$$

Further, when the revolving slip ratio of the ball 8 is 77%, the slip velocity V of the ball 8 relative to the inner ring 6 is as high as 115 m/s:

$$V = 115 \text{ m/s} \qquad (3)$$

Figure 5A:
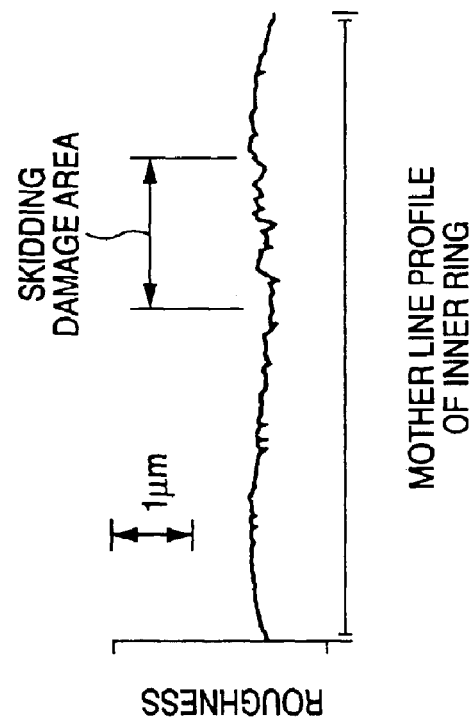
FIG. 5A is a diagram illustrating the results of 200-hour skidding test made on a test bearing having a phosphorus-based modified layer formed thereon.
Figure 5B:
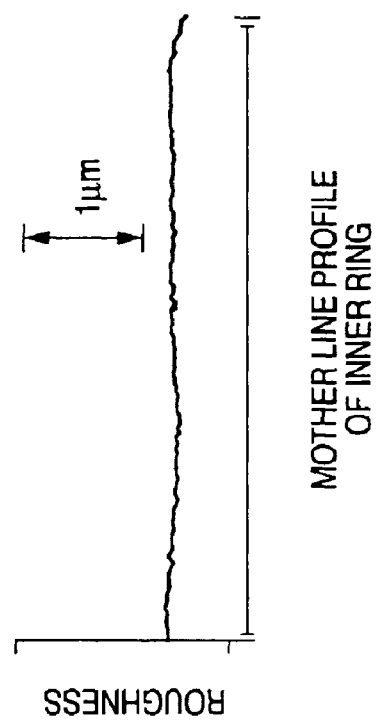
FIG. 5B is a diagram illustrating the results of 200-hour skidding test made on a test bearing free of phosphorus-based modified layer.

The results of 200-hour skidding test on the two test bearings, i.e., test bearing having a phosphorus-based modified layer and test bearing free of phosphorus-based modified layer under the conditions that the slip velocity V of the ball 8 relative to the inner ring 6 is as high as 115 m/s and the load on the test bearing Pr/Cr is 0.003 are shown in FIGS. 5A and 5B. The test bearing having a phosphorus-based modified layer formed thereon shows frequent skidding during the operation at a high rotary speed and a low load but shows no skidding damage over the entire raceway groove 6a of the inner ring 6 as shown in FIG. 5A.

This is because the provision of the phosphorus-based modified layer makes it possible to enhance the bonding of the surface of the raceway groove of the inner ring 6 to the phosphorus compound layer formed via the oxygen compound layer without aggravating the surface roughness thereof and hence give a surface layer suitable for abrasion resistance that lessens the abrasion of the ball 8 with the raceway groove 6a of the inner ring 6.

On the contrary, the test bearing free of phosphorus-based modified layer showed skidding damage on some points along the peripheral direction on the raceway groove 6a of the inner ring 6 because the friction of the ball 8 with the raceway groove 6a of the inner ring 6 was not lessened as shown in FIG. 5B.

Further, since skidding damage can be certainly prevented merely by providing a phosphorus-based modified layer on the surface of the outer ring 4, the inner rings 6 and 7 and the ball 8, the reduction of production cost and the simplification of production process can be accomplished, when compared with the conventional countermeasures against skidding damage in case that rolling element (ball) is made of ceramic, and that pre-pressure is imposed on a roller as a rolling element so that slipping is prevented by outer raceway surface of the outer ring is formed in ellipsoidal or triangular shape.

Figure 6:
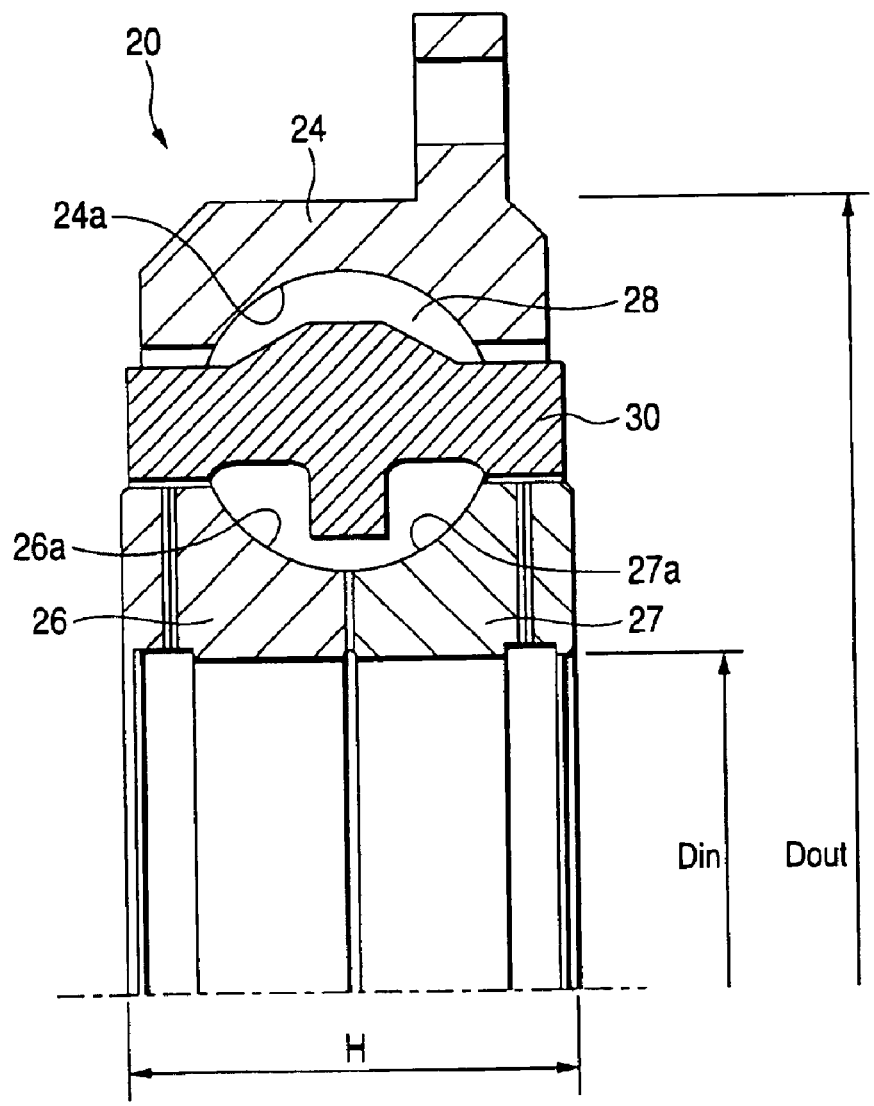
FIG. 6 is a diagram illustrating a main part of a three point contact ball bearing of the second embodiment of the invention.

FIG. 6 illustrates a main part of a three point contact ball bearing 20 according to a second embodiment which is mainly used as a main shaft bearing for aircraft engine.

The three point contact ball bearing 20 of the present embodiment comprises an outer ring 24 and inner rings 26 and 27 formed by bearing steel, a number of balls 28 formed by bearing steel retained interposed between the outer ring 24 and the inner rings 26 and 27, and a retainer 30 formed by bearing steel which retains the balls 28 at a predetermined interval as in the first embodiment. The outer ring 24 has a raceway groove 24a having an arc section with a predetermined radius formed therein. The inner ring 26 has a raceway groove 26a having a gothic arc section formed therein. The ball 28 is a sphere. The ball 28 is retained interposed between the outer ring 24 and the inner ring 26 while coming in contact with the raceway groove 24a of the outer ring 24 at one point and the raceway grooves 26a and 27a of the inner rings 26 and 27 at two points.

The outer ring 24, the inner rings 26 and 27 and the ball 28 of the three point contact ball bearing 20 have a phosphorus-based modified layer formed on the surface thereof as in the first embodiment.

The three point contact ball bearing 20 shown in FIG. 6 took skidding test.

As test bearings there were used two kinds of bearing having an inner diameter Din of 220 mm, an outer diameter Dout of 330 mm and a width H of 55 mm. The inner rings 26 and 27 and the outer ring 24 of these test bearings were made of M50NiL material and the ball 8 of these test bearings were made of M50 material.

One of the two test bearings was then provided with a phosphorus-based modified layer, and the other was free of phosphorus-based modified layer. The two test bearings were then subjected to skidding test.

The two test bearings, i.e., test bearing having a phosphorus-based modified layer formed thereon and test bearing free of phosphorus-based modified layer were then subjected to skidding test for 200 hours under the conditions that the slip velocity V of the ball 28 relative to the inner ring 26 is as high as 87 m/s, the inner ring 26 rotates at a rotary speed as high as 10,000 rpm and the axial load is predetermined to be 26 kgf such that Pr/Cr is as low as 0.01.

The two test bearings which had thus been tested were then each visually observed to examine the raceway groove 26a of the inner ring 26. As a result, the test bearing having a phosphorus-based modified layer formed thereon showed no skidding damage over the entire raceway groove 26a. On the contrary, the test bearing free of phosphorus-based modified layer was found to show skidding damage on some points along the peripheral direction on the raceway groove 26a of the inner ring 26.

While the aforementioned various embodiments have been described with reference to the three point contact ball bearings 2 and 20, the same effects can be exerted also with other types of rolling bearings. While the aforementioned various embodiments have been described with reference to the case where all the parts constituting the rolling bearing have a phosphorus-based modified layer formed thereon, the invention is not limited thereto. At least one of the raceway groove of the outer ring and the inner ring and the ball may have a phosphorus compound layer and an oxygen compound layer of the invention formed thereon.

As mentioned above, in accordance with the invention, the provision of a phosphorus-based modified layer on at least one of the surface of the rolling element and the surface of the race of the outer ring and inner ring over which the rolling element rolls renders these surfaces effective for abrasion resistance, making it possible to provide a rolling bearing which can be certainly protected against skidding damage on the surface of the rolling element and the surface of the race of the outer ring and inner ring over which the rolling element rolls even upon frequent occurrence of skidding due to operation at a high rotary speed and low load and can realize the reduction of production cost and the simplification of production process.

What is claimed is:

1. A rolling bearing comprising:
   at least one outer ring formed by bearing steel;
   at least one inner ring formed by bearing steel; and
   rolling elements formed by bearing steel,
   wherein a phosphorus-based modified layer is formed on at least one surface among a raceway surface of said outer ring, a raceway surface of said inner ring and surfaces of said rolling elements; wherein:
   said rolling elements are balls, said balls are supported at one point on one of said raceway surface of said outer ring and said raceway surface of said inner ring, and said balls are supported at two points on the other of said raceway surface of said outer ring and said raceway surface of said inner ring; and
   said rolling bearing is adapted to be used when a load is less than or equal to 0.05 as calculated in terms of Pr/Cr supposing that a dynamic equivalent radial load is Pr and a basic dynamic rated load is Cr, either one of said inner ring and said outer ring is a driving ring, and a sliding speed of said rolling elements with respect to said driving ring is V, said V is higher than 70 m/s.

* * * * *